April 30, 1968 D. G. BRAITHWAITE ETAL 3,380,900
ELECTROLYTIC PREPARATION OF ORGANIC LEAD COMPOUNDS
AND ELECTROLYTE THEREFOR
Filed Nov. 5, 1964
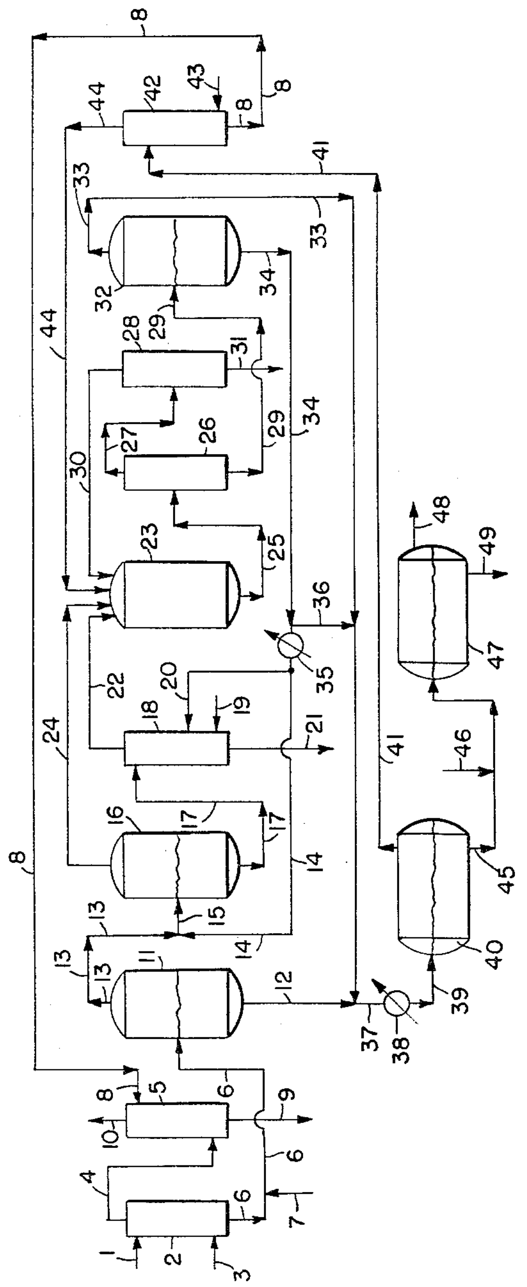
INVENTORS:
DAVID G. BRAITHWAITE
LAWRENCE L. BOTT
KENNETH G. PHILLIPS
BY Wanzall, Johnston, Cook & Root
ATT'YS United States Patent Office 3,380,900 Patented Apr. 30, 1968

3,380,900

ELECTROLYTIC PREPARATION OF ORGANIC LEAD COMPOUNDS AND ELECTROLYTE THEREFOR

David G. Braithwaite, Chicago, Lawrence L. Bott, Oak Park, and Kenneth G. Phillips, Lombard, Ill., assignors to Nalco Chemical Company, Chicago, Ill., a corporation of Delaware Filed Nov. 5, 1964, Ser. No. 409,090
18 Claims. (Cl. 204—59)

ABSTRACT OF THE DISCLOSURE

Water insoluble organic lead compounds are prepared by an electrolytic process herein a Grignard reagent is electrolyzed, using a lead anode, and a water miscible organic ether solvent having a boiling point higher than the boiling point of water. The electrolyte is treated with water in at least two stages and a water insoluble organic lead compound is recovered without distillation. The process is especially useful in making tetraethyl lead and tetramethyl lead.

This invention relates to a process for preparing organic lead compounds and for recovering organic lead compounds from electrolytes, and more particularly to a process for preparing and recovering tetramethyl lead or tetraethyl lead or other tetraalkyl lead compounds, or mixtures thereof, from electrolytes obtained by electrolyzing an anhydrous solution of a Grignard reagent in an organic solvent for the Grignard reagent, using a sacrificial lead anode.

The manufacture of organo metallic compounds, and more specifically organo lead compounds, by electrolyzing an anhydrous solution of a Grignard reagent in an organic solvent for the Grignard reagent is disclosed in U.S. Patents 3,007,857 and 3,007,858. In the process disclosed in U.S. 3,007,858 an excess of organic halide is added to the electrolyte. The term "Grignard reagent" refers to a complex organo magnesium compound which is commonly prepared by reacting magnesium with an organic halide. The term "organic halide" refers to organic chlorides, bromides and iodides. The halogen portion of the added organic halide does not have to be the same as the halogen portion of the Grignard reagent but in practice they are usually the same and the organic chlorides are most commonly employed because of their ready availability.

When lead is used as a sacrificial anode in an organic solvent solution of a Grignard reagent, organo lead compounds are formed. The cathode can be composed of any suitable conducting but non-reacting material, including, for example, ordinary steel, stainless steel, platinum, graphite, or the like. Ordinarily, the anode is composed of lead and the cathode of steel.

Various organic solvents for the Grignard reagent can be employed. Since conductivity of the solvent solution of the Grignard reagent is a factor in the efficient operation of the process, it is desirable to employ solvents which enhance the current efficiency. Water miscible solvents, which boil below the boiling point of the organic lead compound, such as tetrahydrofuran (boiling point 64–66° C.) can be employed. Water immiscible solvents, which boil above the boiling point of the organic lead compound, for example, the dibutylether of diethylene glycol or the hexylethylether of diethylene glycol, with or without water immiscible aromatic hydrocarbons, which boil about the same as or below the organic lead compound, e.g., toluene and/or benzene, can be used. Good results are obtained by employing a combination of solvents boiling below and above the boiling point of the organic lead compound, and preferably also in addition a solvent having approximately the same boiling point as the organic lead compound. Thus, water miscible solvents and water immiscible solvents for the Grignard reagent, particularly a water miscible solvent boiling below the boiling point of the organic lead compound and a water immiscible solvent boiling above the boiling point of the organic lead compound can be used, preferably with the addition of a water immiscible solvent for the organic lead compound having about the same boiling point as the organic lead compound. The organic lead compounds produced in the process are water immiscible.

The end use of the organic lead compounds as antiknock agents in gasoline does not ordinarily permit the retention with the organic lead compounds of the solvents normally employed in producing them. Hence, it is necessary to separate these solvents in such a way that they can be re-used in subsequent processing operations. This separation is not readily accomplished because the organic lead compounds are sensitive to heat and concentration, or, in other words, tend to become unstable under some conditions that might ordinarily be encountered in recovery procedures. The solvents not only have to be separated from the organic lead compound but also, for practical reasons, have to be restored to a condition where they can be re-used in the electrolysis. Furthermore, the Grignard reagent used in the electrolysis is sensitive to water, hence if water is used in the recovery procedures it must be removed later.

In addition to the problem of conductivity of the elec trolyte, there is also a problem that arises due to the fact that some solvents for the Grignard reagent tend to form insoluble substances, such as etherates, in the electrolyte and the presence of such substances can lead to clogging of the system. It would therefore be desirable to have an electrolysis system in which the solvents used do not produce insoluble substances and at the same time provide high conductivity and efficiency. It would also be desirable to have a recovery system in which the organic lead compounds themselves are not distilled or subjected to high temperatures.

One of the objects of the present invention is to provide a new and improved process for preparing organic lead compounds by electrolyzing an organic solvent solution of a Grignard reagent, using a sacrificial lead anode, and employing a solvent system which provides excellent electrical conductivity without the formation of detrimental amounts of insoluble substances.

A further object of the invention is to provide a new and improved recovery system for recovering organic lead compounds and organic solvents from electrolytes derived by electrolyzing an anhydrous organic solvent solution of a Grignard reagent, using a sacrificial lead anode.

Another object of the invention is to provide a recovery system of the type described which avoids the necessity for heating the organic lead compound to elevated temperatures where it might be unstable.

A more specific object of the invention is to provide a new and improved process for preparing tetraalkyl lead compounds, such as tetramethyl lead and tetraethyl lead, by electrolyzing an organic solvent solution of a methyl Grignard reagent or an ethyl Grignard reagent, using a sacrificial lead anode, and employing particular solvents and combinations of solvents for the Grignard reagent which are completely water miscible and provide excellent conductivity without substantial formation of insoluble byproducts.

Another specific object of the invention is to provide a new and improved recovery system for recovery tetramethyl lead or tetraethyl lead and organic solvents from residual electrolytes derived by electrolyzing an anhydrous completely water miscible solvent solution of a methyl Grignard reagent or an ethyl Grignard reagent using a sacrificial lead anode.

Other objects of the invention will appear from the following description in conjunction with the accompanying drawing in which the single figure illustrates diagrammatically a recovery system for organic lead compounds which represents a preferred embodiment of the invention.

In accordance with the invention it has been found that new and improved results in the manufacture of organic lead compounds are obtained by electrolyzing an electrolyte comprising an anhydrous solution of a Grignard reagent in a water miscible organic ether solvent having a boiling point higher than the boiling point of water, using a sacrificial lead anode, preferably with the addition of a water miscible organic ether solvent which boils at a temperature below the boiling point of water and enhances the conductivity of the electrolyte, mixing the residual electrolyte with water in sufficient amount to remove salts from the organic phase thereby forming a brine, separating said brine from the organic phase, contacting said organic phase with additional water to form two liquid phases, one containing most of the water miscible ether solvent dissolved in water and the other containing a water insoluble lead compound in combination with water miscible ether, separating said liquid phase containing said water insoluble organic lead compound and recovering said organic lead compound therefrom and removing the water from said water miscible ether solvent.

Since the preparation of organic lead compounds in this manner preferably involves the addition of an excess of an organic halide to the electrolyte over that required to form the Grignard reagent, residual organic halide will be present in the electrolyte after electrolysis and this residual organic halide should be removed before mixing the spent electrolyte with water. Such removal can be accomplished as hereinafter described.

It is also desirable, although not absolutely essential, to add an acid, preferably HCl, to the water which is mixed with the electrolyte after electrolysis, in amount sufficient to convert magnesium oxyhalides to magnesium halides (e.g. $MgCl_2$). The amount of acid added is preferably sufficient to give a pH from 1 to 4.

The process can be carried out with or without the addition of a water immiscible aromatic hydrocarbon, such as, for example, toluene or benzene, which acts as a solvent for the organic lead compound and assists in diluting the concentration of the organic lead compound. Such hydrocarbon can be added to the electrolyte before electrolysis or to the spent electrolyte after electrolysis. Where tetramethyl lead is being manufactured, it is desirable to use toluene as the hydrocarbon diluent and this is not separated from the tetramethyl lead during the recovery process. Such hydrocarbons usually have no substantial effect on the conductivity of the electrolyte. The amounts added do not normally exceed 25% by weight of the organic lead compound and in the case of tetramethyl lead are usually within the range of 10% to 25% by weight of the tetramethyl lead.

It has been recognized heretofore that tetrahydrofuran which boils below the boiling point of water and is water miscible has a singular effect in enhancing the conductivity of electrolytes containing a Grignard reagent. However, the use of higher concentrations of tetrahydrofuran has been limited by the fact that insoluble by-products tend to form in the electrolyte at such concentrations. For this reason, it has not been practical heretofore to use high concentrations of tetrahydrofuran above 50% by weight of the total ether solvent for the Grignard reagent. It has now been found in the practice of this invention that higher concentrations of tetrahydrofuran can be used in the ether solvent for the Grignard reagent provided the tetrahydrofuran is employed in combination with another water miscible ether solvent for the Grignard reagent which boils above the boiling point of water and particularly where the tetrahydrofuran is employed in combination with tetrahydrofurfurylethylether or the diethyl ether of tetraethylene glycol. It has also been found that tetrahydrofurfurylethylether is effective to enhance the conductivity of electrolytes containing a Grignard reagent and can be used in combination with other water miscible solvents.

Examples of other water miscible solvents which boil above the boiling point of water and can be employed either alone or in conjunction with tetrahydrofuran and/or tetrahydrofurfurylethylether are the diethyl ether of diethylene glycol, the diethyl ether of triethylene glycol and/or the diethyl ether of pentaethylene glycol. Mixtures of two or more such ethers can also be used.

In solvent systems of the type described, water insoluble ethers are excluded because they complicate the recovery system.

A feature of the recovery system as it is practiced in accordance with the present invention resides in the fact that it is unnecessary to subject the organic lead compound to high temperatures or to conditions which might result in its instability. Distillation steps can be employed in the recovery process but are used in stages of the process during which substantial quantities of the organic lead compound are no longer present.

Normally, the electrolysis is carried substantially to exhaustion of the Grignard reagent in the electrolyte but any small quantity of Grignard reagent present in the residual electrolyte is removed by reaction with the water employed to treat the spent electrolyte after the removal of any excess organic halides, such as, for example, methyl chloride or ethyl chloride.

In the manufacture of tetraalkyl lead compounds, such as tetramethyl lead or tetraethyl lead, it is especially desirable to carry out the process by using as a solvent for the Grignard reagent a mixed ether system consisting of 25% to 75% by weight of tetrahydrofuran and 75% to 25% by weight of tetrahydrofurfurylethylether or 75% to 25% by weight of the diethyl ether of tetraethylene glycol, or 25% to 75% by weight of tetrahydrofurfurylethylether and 75% to 25% by weight of the diethyl ether of tetraethylene glycol, the weight percentages of the respective ethers being based solely on the total ether content.

In order to carry out the recovery process, the apparatus used comprises in combination the following:

(a) means for removing free organic halide from the residual electrolyte, (b) means for contacting the remaining electrolyte with water to remove magnesium chloride brine from the organic phase, (c) means for separating said brine from said organic phase, (d) means for contacting said organic phase with water to form two liquid phases, one containing most of the water miscible ether solvent dissolved in water and the other containing a water insoluble organic lead compound and any other additional water immiscible organic solvents, such as toluene or other hydrocarbons along with residual water miscible ethers, (e) means for separating said liquid phase containing said water insoluble lead compound, (f) means for recovering said water insoluble lead compound, and (g) means for removing the water from the water miscible ether solvent.

The electrolysis of the Grignard reagent can be carried out in any suitable manner, for example, by using a cell of the type described in U.S. Patent 3,141,841, patented July 21, 1964.

The following examples illustrate the improved results obtained in the electrolysis where the solvents for the Grignard reagent are completely water miscible. In these examples the quantities are stated in parts by weight unless otherwise indicated.

Example I

The electrolysis was carried out in a pipe cell made from a steel pipe having a 3 inch internal diameter with inlet and outlet openings adjacent opposite ends for introducing and withdrawing the electrolyte. A layer of an electrically insulating foraminous material consisting of fine mesh woven polypropylene filaments and another layer of nylon mesh material was used as a liner on the inside of the pipe. The inside of the pipe was then filled with lead pellets so that the outer boundaries of the lead pellets pressed against the inside of the foraminous material and clamped it against the inside of the pipe. The openings in the foraminous material were sufficiently small so that the lead pellets could not contact the inside of the pipe. The lead pellets were connected to a positive source of direct current and the pipe was connected to a negative source of direct current. In this way, the pipe formed the cathode and the lead pellets formed the sacrificial anode.

The upper and lower parts of the pipe were connected to a recirculating system, including a pump whereby the electrolyte could be pumped externally of the cell through a heat exchanger in order to control the temperature. The temperature can also be controlled by providing a cooling jacket around the cell.

The Grignard solution was prepared by reacting equimolar proportions of ethyl chloride and magnesium in a solvent consisting of 55% by weight of tetrahydrofuran and 45% by weight of tetrahydrofurfurylethylether. Enough excess ethyl chloride was added to give an initial ethyl chloride concentration of 0.3 mole per mole of Grignard reagent.

The electrolysis was conducted at a temperature of 118° F. and a direct current voltage of 17.5. The electrolyte was recirculated in the cell at the rate of 4 gallons per minute. The average current at 17.45 volts was 27.6 amperes per hour and the average current density at this voltage was 18.35 amperes per square foot. The concentration of the Grignard reagent in terms of OH was 1.21 millimoles per gram. The initial charge in kilograms (kg.) was 7.1 of Grignard solution and 0.74 kg. of lead and the initial concentration of ethyl chloride was 0.64 kg.

The process was carried out to a Grignard conversion of 81.5%. The efficiency of the Grignard conversion was 98.5% and the average current efficiency was 173.0%.

The total time required was 8 hours and the total number of ampere hours was 220.4. The yield of tetraethyl lead, based on the magnesium charged, was about 83.5%.

Example II

The procedure was the same as in Example I except that methylmagnesium chloride was used as a starting material and the end product was tetramethyl lead. The Grignard reagent was prepared by reacting methyl chloride with magnesium in a completely water miscible solvent consisting of 45% tetrahydrofuran and 55% by weight of a diethyl ether prepared by reacting 3 moles of ethylene oxide with one mole of the monoethylether of diethylene glycol and converting the terminal hydroxyl group to an ethyl ether group. This last mentioned solvent can also be called the diethyl ether of tetraethylene glycol. The concentration of the Grignard reagent in terms of OH was 1.44 millimoles per gram initially. Excess methyl chloride was added in an amount equal to 0.15 mole per mole of Grignard reagent.

The total charge to the cell consisted of 7.12 kg. of Grignard solution, 0.50 kg. of methyl chloride and 0.825 kg. of lead. The process was conducted until the final concentration of Grignard reagent was 0.08 millimole per gram. The cell effluent consisted of one liquid phase and was clear.

The Grignard conversion was approximately 80%, the yield of tetramethyl lead, based on the Grignard reagent converted, was about 98% and the yield of tetramethyl lead, based on the magnesium used in preparing the Grignard reagent, was about 78.3%.

The average temperature during the run was 110° F., the average voltage was 25.6 volts, the duration of the run was 13.5 hours and the total number of ampere hours was 255. The average current density was 14.8 amperes per square foot and the current efficiency was about 167.5%.

Example III

The general procedure was the same as in Example I except that methyl magnesium chloride was used as a Grignard reagent. This was prepared by reacting methyl chloride with magnesium in a solvent consisting of 35% by weight tetrahydrofuran and 65% by weight of the diethyl ether obtained by reacting 3 moles of ethylene oxide with 1 mole of the monoethylether of diethylene glycol and converting the terminal hydroxyl group to an ethyl ether group. The initial Grignard concentration in terms of OH was 1.49 millimoles per gram. Excess methyl chloride was added initially in an amount corresponding to 0.15 mole per mole of Grignard reagent.

The total initial charge consisted of 8.93 kg. of the Grignard solution, 0.51 kg. of methyl chloride, and 0.805 kg. of lead.

The electrolysis was carried out until the final Grignard concentration was about 0.086 millimole per gram of solution. The average temperature during electrolysis was 95° F., the average voltage 26.4 volts, and the duration of the run was 21 hours. The total number of ampere hours was 246. The yield of tetramethyl lead, based on the Grignard reagent converted was about 80%. The current efficiency was 169.5%. The cell effluent consisted of a single liquid phase and was clear.

Example IV

The process was carried out as described in Example I except that methyl magnesium chloride was used as the Grignard reagent. This was prepared by reacting methyl chloride with magnesium in a solvent consisting of 50% by weight tetrahydrofuran and 50% by weight tetrahydrofurfurylethylether. The starting Grignard concentration was 1.34 millimoles per gram of solution. Initially 0.15 mole of excess methyl chloride per mole of Grignard reagent was added to the solution. The total charge consisted of 7.25 kg. of Grignard reagent solution, 0.442 kg. excess methyl chloride, and 0.783 kg. of lead.

The duration of the run was 7.5 hours, the average temperature was 108° F., the average voltage was 20.5 volts, and the current density was 28.2 amperes per square foot.

The run was carried out until 86.5% of the Grignard reagent had been converted. The yield of tetramethyl lead based on the Grignard reagent converted was 91.2%. The current efficiency was 186.5%. The cell effluent consisted of a single liquid phase which was clear and no crystals separated on standing.

Example V

The electrolysis was carried out as described in Example I except that methyl magnesium chloride was used as the Grignard reagent. This was prepared by reacting methyl chloride with magnesium in a completely water miscible solvent consisting of 75% by weight tetrahydrofuran and 25% of tetrahydrofurfurylethylether. The initial concentration of the Grignard reagent in this solvent was 1.32 millimoles per gram of solution. Excess methyl chloride in the amount of 0.15 mole per mole of Grignard reagent was added to the solution.

The electrolysis was carried out at 113.5° F. with an average voltage of 26.8 and an average current of 23.9 amperes per hour. The total number of ampere hours was 217 and the current density was 15.9 amperes per square foot.

The Grignard conversion was 72.5%, the yield of tetramethyl lead based on the Grignard reagent converted was 92.6%, and the current efficiency was 167%.

The cell effluent consisted of a single liquid phase which was clear and contained no crystals.

Example VI

The procedure was the same as in Example I except that methyl magnesium chloride was used as the Grignard reagent. This was prepared by reacting equimolar proportions of magnesium and methyl chloride in a completely water miscible solvent consisting of 50% by weight tetrahydrofuran and 50% by weight of tetrahydrofurfurylethylether. Excess methyl chloride was added to provide 0.3 mole of free methyl chloride per mole of Grignard reagent. The initial concentration of the Grignard reagent in the solution was 1.16 millimoles per gram of solution.

The initial charge consisted of 7.1 kg. of Grignard solution, 0.6 kg. of methyl chloride and 0.815 kg. of lead.

The electrolysis was carried out at a temperature of 93.5° F. and an average voltage of 22.2 volts for 13 hours. The total ampere hours was 250.2. The current density was 17.3 amperes per square foot. The current efficiency was 168%.

The Grignard conversion was approximately 96%. The yield of tetramethyl lead, based on the Grignard reagent converted, was about 99.2% and the yield of tetramethyl lead, based upon the magnesium used in making the Grignard reagent, was about 95%.

The cell effluent consisted of a single liquid phase which was clear except for a small amount of black precipitate.

Example VII

The procedure was generally the same as that described in Example I except that the Grignard reagent consisted of methyl magnesium chloride prepared by reacting methyl chloride with magnesium in a completely water miscible solvent consisting of 50% tetrahydrofuran and 50% by weight of the diethylether of diethylene glycol. The initial concentration of the Grignard reagent in the solution was about 1.48 millimoles per gram. The total charge was 100.8 kg. of Grignard solution, 5.2 kg. of methyl chloride, and 13.5 kg. of lead.

The temperature used was 123° F. and the duration of the run was 26 hours at an average voltage of 19 volts. The current density was 26.3 amperes per square foot and the total number of ampere hours was 3854.

The Grignard conversion was about 88.3%. The yield of tetramethyl lead, based on the Grignard reagent converted, was about 99%, and the yield of tetramethyl lead, based on the magnesium charged, was about 87.2%. The current efficiency was about 180%.

The cell effluent consisted of two phases and crystallization occurred on standing.

The following description illustrates a preferred method and apparatus for recovering the organic lead compound from the cell effluent.

Referring to the single figure of the drawings, cell liquor containing tetramethyl lead, tetrahydrofuran (hereafter called THF) the diethyl ether of tetraethylene glycol (hereafter called DEETEG), methyl chloride, toluene and some dissolved excess gaseous hydrocarbons, is introduced into the recovery system through pipe or line 1, to a gas stripper 2. Natural gas is introduced through line 3. The overhead containing a part of the THF, hydrocarbons and some methyl chloride passes through an outlet from the top of the vessel 2 to line 4 and then into gas stripper tower 5. The liquid phase from gas stripper 2 consisting of THF, tetramethyl lead, toluene, DEETEG and magnesium chloride is withdrawn through line 6. Water containing sufficient hydrochloric acid to give a pH of 3 is added through line 7. This serves to dissolve the magnesium chloride, forming a brine, and the acid converts any magnesium oxychloride to magnesium chloride.

In tower 5, dry DEETEG is added from line 8. This dissolves the methyl chloride and the solution of methyl chloride in DEETEG is withdrawn through line 9 and used in making Grignard reagent for the cell system, not shown. The gases passing out of tower 5 are burned or used for heating.

The liquor in line 6 is introduced into tank 11 where it separates into two phases, a top organic phase containing THF, tetramethyl lead, toluene and DEETEG and a lower brine phase containing about 27% $MgCl_2$ along with THF and some DEETEG. The high salt concentration in the brine salts out most of the DEETEG into the organic layer.

The brine layer is withdrawn through line 12 and the upper organic non-aqueous layer through line 13.

The organic liquid phase in line 13 is mixed with water and DEETEG is passed from line 14 and the mixture is 16 where an upper aqueous phase and a lower non-aqueous phase are formed. The lower phase consists essentially of tetramethyl lead, THF, toluene and DEETEG. passed through line 15 to a second phase separation tank The top layer consists essentially of THF, DEETEG, and water.

The bottom layer is passed through line 17 to a countercurrent water extraction tower 18 where it is contacted with fresh water introduced through line 19 and a solution of DEETEG in water introduced through line 20. The water immiscible phase consisting of tetramethyl lead and toluene is withdrawn through line 21 and is ready to be used as a gasoline additive or combined with other solvents such as ethylene dichloride or ethylene dibromide before being employed as a gasoline additive.

The overhead from tower 18 is a solution of THF and DEETEG in water and is passed through line 22 to surge tank collector 23. The upper aqueous phase from tank 16 is introduced into tank 23 through line 24.

A solution of THF and DEETEG in water is withdrawn from tank 23 through line 25 and passed into an atmospheric pressure azeotropic colume 26. The overhead from this column consisting of THF and some water is withdrawn through line 27 and passed to a high pressure (e.g. 65 p.s.i.g.) azeotropic column. The residue is withdrawn through line 29 and consists of a solution of DEETEG in water.

The overhead from column 28 consisting essentially of THF and water is returned through line 30 to tank 23. The residue which is dry THF is withdrawn through line 31 and re-used in the process.

Line 29 discharges into separator tank 32 whose contents are heated to about 215° F. The DEETEG becomes less water soluble on heating and two liquid layers are formed. The upper layer consisting of a major proportion of DEETEG and a minor proportion of water is withdrawn through line 33. The bottom layer is withdrawn through line 34 and consists of a minor proportion of DEETEG and a major proportion of water. A portion of the liquid in line 34 is cooled by passing it through a heat exchanger 35. This portion is then recycled to the process partly through line 14 and partly through line 20. The remaining portion of the liquid in line 34 is bypassed through line 36 to line 33*a* and then to line 37 where it is mixed with the brine from line 12 and heated to a temperature of about 203° F. by passage through a steam heated heat exchanger 38. The hot mixture is then passed through line 39 to phase separator tank 40.

In phase separator tank 40 two layers are formed. The upper layer consisting essentially of DEETEG, minor amounts of THF and water is withdrawn through line 41 and passed to the upper part of gas dryer tower 42. The temperature of this tower is around 95° C. and natural gas is introduced through line 43 to assist in stripping off THF and water which is withdrawn through line 44 and recycled to tank 23.

The brine phase from tank 40 is withdrawn through line 45. Toluene is added through line 46 to extract THF and DEETEG from the brine. The mixture is passed to tank 47 where two phases form. The upper phase containing THF, toluene and DEETEG is withdrawn through line 48 and re-used in the process. The residual brine is withdrawn through line 49 and either run to waste or treated to remove the magnesium chloride.

Suitable valves and pumps, not shown, are provided to control liquid flow through the apparatus.

The following material balance illustrates the various approximate proportions of materials present at different stages of the recovery process.

This ether has a molecular weight of 130, a density of 0.938, a boiling point of 152–154° C. at 726 mm. of mercury pressure and is a colorless liquid. Of the other water miscible ethers which have a relatively high boiling point and are especially useful in the process, the diethyl ethers of diethylene glycol, triethylene glycol, tetraethylene glycol and pentaethylene glycol, and mixtures thereof, are preferred. Ethers such as the diethyl ether of tetraethylene glycol and other water miscible diethers of polyoxyalkylene glycols which become less water soluble when heated are especially useful because of greater ease of recovery as well as high conductivity and good compatibility with tetrahydrofuran. The invention also contemplates the manufacture of other organic lead compounds using other Grignard reagents as starting materials.

TABLE I.—MATERIALS IN POUNDS PER HOUR

| Line Location | Methyl Chloride | THF | TML | Toluene | DEETEG | $MgCl_2$ | $H_2O$ |
|---|---|---|---|---|---|---|---|
| 1 | 400 | 9,000 | 4,250 | 450 | 9,00 | 3,560 | |
| 4 | 400 | 2,000 | | | | | |
| 6 | | 7,000 | 4,250 | 450 | 9,000 | 3,560 | |
| 7 | | | | | | | [1] 8,300 |
| 8 | | | | | 8,647 | | |
| 9 | 400 | 2,000 | | | 8,647 | | |
| 10 | Trace | Trace | | | | | |
| 12 | | 1,000 | | | 500 | 3,560 | 8,300 |
| 13 | | 6,000 | 4,250 | 450 | 8,500 | | |
| 14 | | | | | 2,400 | | 13,600 |
| 17 | | 3,390 | 4,250 | 450 | 3,860 | | |
| 19 | | | | | | | 5,000 |
| 20 | | | | | 1,950 | | 11,050 |
| 21 | | | 4,250 | 450 | | | |
| 22 | | 3,390 | | | 5,810 | | 16,050 |
| 24 | | 2,610 | | | 7,040 | | 13,600 |
| 25 | | 11,400 | | | 12,850 | | 30,250 |
| 27 | | 11,400 | | | | | 600 |
| 29 | | | | | 12,838 | | 29,662 |
| 30 | | 5,400 | | | | | 600 |
| 31 | | 6,000 | | | | | |
| 33 | | | | | 8,225 | | 3,525 |
| 33a | | | | | 8,487 | | 5,013 |
| 34 | | | | | 4,613 | | 26,137 |
| 36 | | | | | 262 | | 1,488 |
| 39 | | 1,000 | | | 8,987 | 3,560 | 13,313 |
| 41 | | 500 | | | 8,647 | | 454 |
| 44 | | 500 | | | | | 454 |
| 45 | | 500 | | | 340 | 3,560 | 12,859 |
| 46 | | | | 450 | | | |
| 48 | | 500 | | 450 | 340 | | |
| 49 | | | | | | 3,560 | 12,859 |

[1] Acids.

In the foregoing table THF is tetrahydrofuran, TML is tetramethyl lead, DEETEG is the diethyl ether of tetraethylene glycol and $MgCl_2$ is magnesium chloride.

The foregoing system is adapted for the production of any tetraalkyl lead compound, such as, tetramethyl lead, tetraethyl lead and mixtures comprising tetramethyl lead, triethylmethyl lead, dimethyldiethyl lead, trimethylethyl lead and tetraethyl lead. The advantage of using an electrolysis system of this type in which the Grignard reagents are dissolved in organic ethers which are completely water miscible is two-fold. In the first place, there is a substantial improvement in conductivity over systems of the type heretofore employed where water immiscible ether solvents have been employed, and secondly, essentially only water washing is necessary to effect separation of organic lead compounds from the solvents. This avoids the necessity for steam distilling organic lead compounds or carrying out other types of distillations which might tend to unduly concentrate the organic lead compounds and create instability of such compounds.

The tetrahydrofurfurylethylether which is useful in the practice of the invention is also known as 2-ethoxymethyl tetrahydrofuran and has the following general formula:

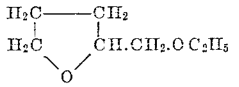

rials. Specific examples of other Grignard reagents are ethyl magnesium bromide, isopropyl magnesium chloride, isopropyl magnesium bromide, butyl magnesium chloride, butyl magnesium bromide, amyl magnesium bromide, amyl magnesium chloride, and higher alkyl homologues. Similarly, the phenyl magnesium chloride, phenyl magnesium chloride, or mixtures or phenyl and methyl magnesium chloride, or mixtures of phenyl and methyl magnesium bromide can be electrolyzed to produce other organic lead compounds containing the phenyl radical or both the phenyl and ethyl radicals, or both the phenyl and methyl radicals, or both the phenyl and other alkyl radicals in case a higher alkyl magnesium halide is substituted for the ethyl magnesium halide or the methyl magnesium halide.

In general, the Grignard reagents are prepared by reacting organic halides, such as ethyl chloride, methyl chloride, phenyl chloride, benzyl chloride, cyclohexylchloride, and higher homologues of the alkyl halides with magnesium. Likewise, the corresponding bromides and iodides of the alkyl halides can be used as a substitute for or to partly replace the organic chlorides. As a general rule it is preferable to use organic halides containing not more than eighteen carbon atoms.

As previously indicated it is preferable to carry out the electrolysis in an extraneous organic halide, i.e., an excess or additional quantity of the organic halide over the equimolar proportions initially required to react with magnesium to form a Grignard reagent. The amount of excess or free organic halide will vary depending upon the particular organic lead compound to be produced but the total concentration is usually within the range of 0.1 to 1.1 moles per mole of total Grignard reagent.

In carrying out the process the initial Grignard concentration is subject to wide variation but is preferably within the range of 0.5 to 2.5 millimoles per gram of solution.

The voltages and amperages used in the electrolysis are also subject to variation. Thus, the voltages may vary within the range of 2 to 35 volts and the current requirements are usually within the range of 2 to 30 amperes. The current density will usually vary within the range of about 2 amperes per square foot to 30 amperes per square foot. The optimum current density will vary somewhat depending upon the temperature. In general the higher the temperature used the higher the current density. Temperatures of 30° C., 35° C., 45° C., 50° C. and in some cases higher temperatures can be used with satisfactory results.

So much of this application as relates to extracting a glycol diether from the brine phase with a liquid hydrocarbon is disclosed and claimed in application Ser. No. 513,833, filed Dec. 14, 1965.

The invention is hereby claimed as follows:

1. A process of producing water insoluble organic lead compounds which comprises (a) electrolyzing a Grignard reagent in an anhydrous water miscible substantially inert organic ether solvent having a boiling point higher than the boiling point of water, using a lead anode, (b) mixing the resultant electrolyte with water in sufficient amount to remove salts from the organic phase thereby forming a brine and a non-aqueous organic phase, (c) separating said brine from the non-aqueous organic phase, (d) extracting said non-aqueous organic phase with additional water sufficient to form two liquid phases, one containing water miscible ether solvent dissolved in water and the other containing a water insoluble organic lead compound, (e) separating said liquid phase containing said water insoluble organic lead compound without distillation, and (f) removing the water from said water miscible ether solvent.

2. A process as claimed in claim 1 in which said liquid phase from step (e) containing said water insoluble lead compound also contains a water miscible ether solvent, and said ether solvent is separated from said organic lead compound.

3. A process as claimed in claim 1 in which said organic ether solvent in (a) is composed of a mixture of completely water miscible solvents one of which boils below the boiling point of water and the other of which boils above the boiling point of water.

4. A process as claimed in claim 1 in which said organic ether solvent in (a) consists essentially of 25% to 75% by weight tetrahydrofuran and 75% to 25% by weight of a water soluble organic ether having a boiling point higher than the boiling point of water.

5. A process as claimed in claim 1 in which said organic ether solvent in (a) consists essentially of 25% to 75% by weight tetrahydrofuran and 75% to 25% by weight of tetrahydrofurfurylethylether.

6. A process as claimed in claim 1 in which said organic ether solvent in (a) consists essentially of 25% to 75% by weight tetrahydrofuran and 75% to 25% by weight of a diethyl ether from the class consisting of diethyl ethers of diethylene glycol, triethylene glycol, tetraethylene glycol, and pentaethylene glycol and mixtures thereof.

7. A process as claimed in claim 1 in which said organic ether solvent in (a) consists essentially of 25% to 75% by weight tetrahydrofuran and 75% to 25% by weight of the diethyl ether of tetraethylene glycol.

8. A process as claimed in claim 1 in which excess organic halide is present in the Grignard reagent solution and is substantially removed before the resultant electrolyte is treated with water.

9. A process as claimed in claim 1 in which free organic halide is present in the electrolyte from step (a) and said organic halide is at least partly extracted from said electrolyte with an inert non-aqueous solvent for said organic halide prior to step (b).

10. A process as claimed in claim 9 in which said inert non-aqueous solvent is an organic ether solvent recycled from a subsequent step of the recovery process.

11. A process as claimed in claim 1 in which the brine formed in step (b) is subsequently mixed with an aqueous solution of organic ether solvent recycled from a subsequent step of the process after removal of the organic lead compound but prior to final drying of the organic ether solvent.

12. A process as claimed in claim 1 in which said organic ether solvent having a boiling point higher than the boiling point of water has the property of decreasing solubility in water when heated near the boiling point of water, and the aqueous liquid phase containing said solvent is heated to a temperature near the boiling point of water after the removal of said organic lead compound.

13. A process as claimed in claim 1 in which the Grignard reagent is a methyl Grignard reagent and the organic lead compound is tetramethyl lead.

14. A process as claimed in claim 1 in which the Grignard reagent is an ethyl Grignard reagent and the organic lead compound is tetraethyl lead.

15. A process of producing water insoluble organic lead compounds which comprises (a) electrolyzing a Grignard reagent, using a lead anode, in an anhydrous water miscible substantially inert organic ether solvent for said Grignard reagent, at least one component of said organic ether solvent having a boiling point higher than the boiling point of water, (b) mixing the resultant electrolyte with water in sufficient amount to remove inorganic salts from the organic phase thereby forming a brine, (c) separating said brine from the organic phase, (d) contacting said organic phase with additional water sufficient to form two liquid phases, one containing water miscible organic ether solvent dissolved in water and the other containing a water insoluble organic lead compound and water miscible organic ether solvent, (a) drying said liquid phase containing water miscible organic ether solvent dissolved in water, (f) contacting the other liquid phase with additional water to form an aqueous phase and a non-aqueous liquid phase containing the organic lead compound, (g) recovering the organic lead compound from the last named phase without distillation, and (h) recovering water miscible ether solvent from the aqueous phase from (f).

16. An electrolyte for producing water insoluble organic lead compounds by electrolyzing a Grignard reagent in an anhydrous organic solvent, using a lead anode, said electrolyte consisting essentially of a solution of said Grignard reagent in a mixture of 25% to 75% by weight tetrahydrofuran and 75% to 25% by weight of tetrahydrofurfurylethylether.

17. An electrolyte for producing water insoluble organic lead compounds by electrolyzing a Grignard reagent in an anhydrous organic solvent, using a lead anode, said electrolyte consisting essentially of a solution of said Grignard reagent in a mixture of organic ethers one of which is tetrahydrofurfurylethylether.

18. An electrolyte for producing water insoluble organic lead compounds by electrolyzing a Grignard reagent in an anhydrous organic solvent, using a lead anode, said electrolyte consisting essentially of a solution of said Grignard reagent in a mixture of 25% to 75% by weight of tetrahydrofurfurylethylether and 75% to 25% by weight of the diethyl ether of tetraethylene glycol.

References Cited

UNITED STATES PATENTS

| | | | |
|---|---|---|---|
| 3,164,537 | 1/1965 | Linsk et al. | 204—59 |
| 3,312,605 | 4/1967 | Braithwaite | 204—59 |

FOREIGN PATENTS

| | | |
|---|---|---|
| 682,451 | 3/1964 | Canada. |

HOWARD S. WILLIAMS, *Primary Examiner*

UNITED STATES PATENT OFFICE
CERTIFICATE OF CORRECTION

Patent No. 3,380,900 April 30, 1968

David G. Braithwaite et al.

It is certified that error appears in the above identified patent and that said Letters Patent are hereby corrected as shown below:

Column 2, line 70, "recovery" should read -- recovering --. Column 8, line 19, after "mixture is" insert -- passed through line 15 to a second phase separation tank --; line 23, cancel "passed through line 15 to a second phase separation tank". Columns 9 and 10, TABLE I, sixth column, line 1 thereof, "9,00" should read -- 9,000 --. Column 12, line 55, "(a)" should read -- (e) --.

Signed and sealed this 2nd day of December 1969.

(SEAL)
Attest:

Edward M. Fletcher, Jr.
Attesting Officer

WILLIAM E. SCHUYLER, JR.
Commissioner of Patents